United States Patent [19]

Bourauel et al.

[11] Patent Number: 4,551,703

[45] Date of Patent: Nov. 5, 1985

[54] SERVICE INTERVAL SIGNALLING DEVICE FOR PRIME MOVERS

[75] Inventors: Fritz Bourauel; Walter Weishaupt, both of Munich, Fed. Rep. of Germany

[73] Assignee: Bayerische Motoren Werke AG, Fed. Rep. of Germany

[21] Appl. No.: 448,849

[22] PCT Filed: Apr. 8, 1982

[86] PCT No.: PCT/EP82/00081

§ 371 Date: Dec. 7, 1982

§ 102(e) Date: Dec. 7, 1982

[87] PCT Pub. No.: WO82/03714

PCT Pub. Date: Oct. 28, 1982

[30] Foreign Application Priority Data

Apr. 10, 1981 [DE]  Fed. Rep. of Germany ....... 3114689

[51] Int. Cl.[4] ............................................. B60Q 1/00
[52] U.S. Cl. .............................. 340/52 D; 340/309.15; 340/522
[58] Field of Search ................... 340/679, 522, 309.15, 340/52 D; 73/117.3

[56] References Cited

U.S. PATENT DOCUMENTS

| | | | |
|---|---|---|---|
| 2,261,770 | 11/1941 | Kusinitz | 73/499 |
| 3,603,880 | 9/1971 | Brecker et al. | 340/309.15 |
| 3,903,736 | 9/1975 | Bissett et al. | 73/117.3 |
| 3,925,754 | 12/1975 | Ota et al. | 340/52 D |
| 4,129,037 | 12/1978 | Toalson | 73/117.3 |

Primary Examiner—Jerry W. Myracle
Attorney, Agent, or Firm—Craig and Burns

[57] ABSTRACT

The signalling device provides a signal indicating the need for a maintainance service when a limit value of a given magnitude is reached. This magnitude is a function of the total number of revolutions of an output shaft or any other rotary part and optionally of one or a plurality of additional operation parameters.

19 Claims, 1 Drawing Figure

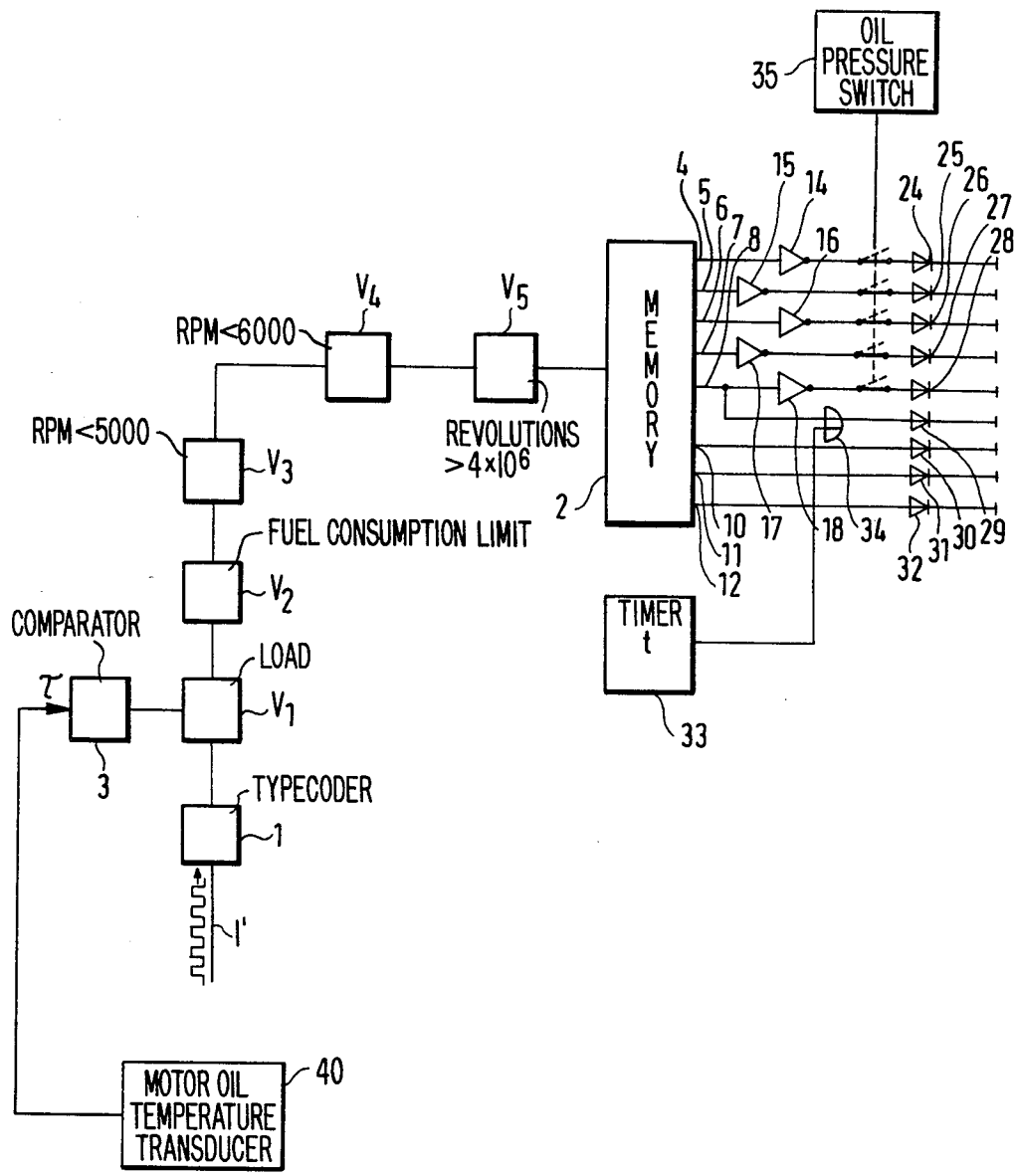

SERVICE INTERVAL SIGNALLING DEVICE FOR PRIME MOVERS

The invention relates to a service interval signaling device for prime movers driving additional appliances by way of an output shaft, with a signal generator yielding a signal when a threshold value for a characteristic magnitude or operating parameter, such as engine operating hours for example, has been reached. The prime movers can be, for example, internal combustion engines or electric motors. Driven appliances can be, for example, compressors, heat pumps, automotive vehicles, or hydraulic installations.

In such a conventional signal device, the total number of operating hours is considered as a characteristic magnitude. However, no consideration is given to the actual load exerted on the prime mover. As a consequence, servicing is frequently performed much too early since the limit or threshold value for the characteristic magnitude or operating parameter, for example operating hours, must be dimensioned so that servicing is executed in time even under extreme loads on the prime mover. Otherwise, service would be performed too late in case of extremely stressed prime movers. This means unnecessarily high operating costs for the plurality of users or the prime movers. This procedure is likewise disadvantageous from the viewpoint of economy, since frequently parts must be exchanged for precautionary purposes even though such parts would still work perfectly for a certain operating period and thus could remain in the prime mover or in the driven appliances.

The invention is based on the object of providing a signaling device of the type discussed above which, in most cases, will draw attention to a necessary service only if indeed necessary.

This object has been attained by making the characteristic magnitude, operating parameter, dependent on the total number of revolutions of the output shaft or of another rotating part.

The invention makes it possible to adapt the service interval to the actual requirements. In case of a gentle operating mode, for example with avoidance of extreme numbers of revolutions, the service interval can be expanded to be longer than the interval employed in the case of considering the operating hours exclusively, or in case of a predominantly extreme stressing of the prime mover.

It is possible to utilize as the characteristic magnitude solely, or operating parameter, the total number of revolutions of the output shaft. In contrast thereto, an even further improved adaptation of the signal transmitted by the signal generator to the actual necessity of servicing is obtained if the characteristic magnitude is composed of the actual total number of revolutions and an additional component formed in correspondence with the load on the prime mover.

Consideration of the load can be effected in various ways. Thus, it is possible to introduce the additional component by addition in correspondence with such load. However, the additional component can be taken into account especially simply from the viewpoint of circuit technology and with great accuracy by multiplying the load in the form of a factor applied to the number of revolutions before recording thereof. Such a multiplication can be achieved, for example, by the introduction of input attenuators which are fed with pulses in correspondence with the revolutions and which are actuated, for example, in case of an extreme load on the prime mover so that evaluation of the number of revolutions takes place in correspondence with the load.

This factor can be introduced in various ways. Thus, it is possible, for example, to make the factor effective and/or ineffective only at an extreme value of an operating parameter. The factor can be activated and/or inactivated as long as the extreme value prevails, or alternatively until a given number of revolutions has been reached.

However, the factor can also be effective and/or ineffective only as long as the value of the operating parameter ranges above or below a predetermined limit value, respectively. In this case, the factor becomes effective also merely during an extreme load on the prime mover while it does not appear under "normal" load. Thereby the computing expenditure can also be kept at a low value in this process.

A factor, which comes into play only at an extreme value of an operating parameter, can be constant or can be varied in accordance with the value of the operating parameter. While a constant factor can be taken into account with low computing expenditure, a varying factor offers the advantage that the added magnitude provided by the factor can be chosen in correspondence with the actual requirements, and the service interval can be optimally predetermined.

Another optimization of the service interval can be achieved by composing the factor of several parts assigned to different operating parameters. Since excess load on the prime mover can occur at extreme values of various parameters, the service interval can be chosen with exactness by considering all, or a large portion, of these parameters.

The load criterion can be the number of revolutions of the output shaft proper, the temperature of an operating fluid, such as cooling water or motor oil and/or the fuel consumption rate. Transducers are customarily provided anyway for all criteria, so that recording of this criterion is possible with little expenses for apparatus.

Another advantageous measure within the scope of this invention can be to subdivide the limit value for the characteristic magnitude or operating parameters into identical intervals and to associate each of these intervals with a control lamp which is extinguished at the end of the interval. By subdividing the intervals, it is thus possible to recognize an especially stressful mode of operation even before the limit value has been reached since then the control lamp of the associated interval is extinguished at perceptibly greater speed.

It will frequently be sufficient to turn on the control lamps only before turning on or starting the prime mover and to turn them off immediately thereafter. With each turn-on step, the operator thus receives information on the still remaining operating period and otherwise is not disturbed by the control lamps during operation.

In addition to the control lamps, it is possible to permanently turn on a warning indicator, e.g. in the form of a single warning lamp having a color different from that of the control lamps, if service is not performed, upon reaching the limit value for the characteristic magnitude or operating parameter, formed according to the invention by itself or in conjunction with a load-dependent evaluation from the number of revolutions of the output shaft. Furthermore, additional warning lamps can be turned on permanently after the same overdue intervals. Also these intervals can be determined by evaluating the number of revolutions of the output shaft and can be half as long as the intervals for the characteristic magnitude. With increasing urgency, a signal is given pointing to the necessity of servicing.

Simultaneously with, or instead of, a warning indication, a signal in writing can be lit up permanently, thus likewise clearly pointing to the necessity of servicing.

In order to provide signaling for servicing for example in case of an extremely short yearly operation, the limit value for the characteristic magnitude can be associated with a desired time period, the signal also appearing after elapse of this period; the desired time period can equal the actually elapsed time since the last servicing. In such cases, servicing becomes necessary due to aging phenomena, for example with respect to the operating fluids employed, which are phenomena not of any consideration in a "normal" mode of operation. Thus, the service interval is also optimized in this case, and service is signaled when necessary.

The desired time period can be subdivided into a number of desired time interval increments equal to the number of characteristic magnitude intervals. The switching condition of the of each control lamps is then also varied if the respective desired time interval has elapsed before the corresponding characteristic magnitude interval. By an appropriate selection of the limit value for the characteristic magnitude and the desired time period, the objective is attained that a change in the switching condition of the control lamps due to elapse of the desired time intervals takes place only in those cases where the total number of revolutions is at a below-average low value. Thus, in most instances, the total number of revolutions will remain the determining factor for the signaling device. In this way, the objective can be attained that signaling of required servicing is performed, besides in case of the prime movers having an at least average operating period, also in case of the prime movers which are used relatively infrequently.

Since the service required upon elapse of the desired time period is usually different from the service necessary when the limit for a given magnitude has been reached—in the latter case, for example, oil service will merely be required—luminous letters can be actuated upon elapse of the desired time period, different from the luminous letters turned on when the limit value for the characteristic magnitude has been reached. This differentiation can be obtained, for instance, by the luminous writing "Oil Service" in case of the limit value for the characteristic magnitude, and "inspection" after the elapse of the desired time period.

A warning signal can also be permanently turned on when the desired time period has been exceeded, just as in case of reaching the limit value for the desired magnitude.

This warning signal can consist in the warning lamps for the overdue intervals. For this purpose, the overdue intervals are associated with corresponding identical overdue time intervals which are about half as long as the desired time intervals; if these elapse before elapse of the associated overdue interval, these warning lamps are likewise turned on. By this halving of the time intervals after elapse of the desired time period, a reinforcing of the warning function is accomplished substantially more rapidly even in little-used prime movers.

In most cases, servicing is executed long before elapse of the desired time period when the limit value of the characteristic magnitude has been reached. One example for applying this feature to use of the internal combustion engine of an automotive vehicle is, for the desired time period, a time of eleven months and, for the limit value of the characteristic magnitude, a value of $2 \cdot 10^7$ revolutions. In this case, servicing resides, for example, in an oil service. After about twice the limit value for the characteristic magnitude, the so-called maximum value, more comprehensive maintenance is required in most cases. This maintenance corresponds in its extent approximately to servicing after elapse of the desired time period. In order to signal such servicing especially markedly with the aid of the signaling device, the feature is provided that, after conducting servicing upon attainment of the limit value for the characteristic magnitude, the difference of the present value for the characteristic magnitude is subdivided, starting with a maximum value about twice as large as the limit value, into identical differential intervals, the number of which is equal to the number of characteristic magnitude intervals and taking the place of the latter. Directly after conducting such a servicing, as a result, the switching condition of the control lamps is determined by the elapsed time, which is considered without change. During the further course of the procedure, the switching condition of the control lamps, however, is again frequently determined by the total number of revolutions.

Just as in case of the limit value for the characteristic magnitude and after elapse of the desired time period, the warning signal can also be activated in case of the maximum value. The driver then also obtains in this case a precise indication by how much he has exceeded the maximum value.

Additionally, upon reaching of the maximum value, the same luminous letters can appear as in case of an elapse of the desired time period. In this way, the fact is taken into account that the maintenance to be performed is extensively the same in both cases.

The invention will be explained in greater detail with reference to an embodiment illustrated in the drawing. The drawing shows a service interval signaling device for an internal combustion engine wherein the number of revolutions of the output shaft is evaluated in accordance with the load.

Pulses corresponding to the number of revolutions of an output shaft are transmitted to the circuit arrangement. These input pulses at $1'$ pass, via a type coder 1, covering various types of prime movers or driven appliances, via input attenuators $V_1$ through $V_5$ into a memory 2. The input attenuator $V_1$ takes into account an extreme load on the internal combustion engine due to a low temperature of an operating fluid, such as, for example, the motor oil. For this purpose, the output signal of a motor oil temperature transducer 40 is transmitted to a comparator 3; the latter yields an output signal under a predetermined temperature of, for example 320° K., then cutting out the input attenuator $V_1$. This means that the input attenuator $V_1$ is effective above this temperature and then reduces the number of pulses transmitted to the input attenuator $V_2$.

The input attenuator $V_2$ considers the fuel consumption rate and is turned on as long as this rate is below a predetermined limit value.

The input attenuators $V_3$ and $V_4$ consider a load on the internal combustion engine based on the number of revolutions of the output shaft or of a rotating part proper. The input attenuator $V_3$ remains turned on as long as a predetermined limit speed of, for example, 5,000 r.p.m., has not as yet been attained. The input attenuator $V_4$ is effective until the speed exceeds a second, higher limit value of, for example, 6,000 r.p.m. The input attenuators $V_3$ and $V_4$ thus take into account digitally differently high numbers of revolutions.

The duration of inactivity of the input attenuators $V_1$ through $V_4$ can be selected to be as long as the considered, extreme load on the car engine prevails. However, the duration can also be chosen to be for a predetermined time period and/or number of revolutions. For this purpose, time elememts and/or revolution pulse counters, not shown, can be utilized which determine the inactivity period of the input attenuators.

The input attenuator $V_5$ yields respectively an output signal for predetermined total numbers of revolutions of, for example, $4 \cdot 10^6$. This number corresponds exactly to the actual total number of revolutions if exclusively extreme loads have been exerted on the internal combustion engine and thus all of the input attenuators $V_1$ through $V_4$ have been inactive. However, in the normal case, this number is smaller than the actual total number of revolutions in correspondence with the load factors applied by the input attenuators $V_1$ to $V_4$. The ratio of the total number calculated with the aid of the input attenuators $V_1$ to $V_4$, and the actual total number, is the higher, the smaller the load on the internal combustion engine.

The output pulses of the input attenuator $V_5$ pass into the memory 2, designed as a shift register, this memory activating its outputs 4–8 and 10–12 at intervals of $4 \cdot 10^6$ revolutions of the evaluated total number of revolutions, i.e. the value obtained by calculation from the actual figure.

Outputs 4 through 8 are connected via inverters 14 through 18 with, for example, green light-emitting diodes 24 through 28 which are extinguished in series according to the spacing of these total numbers of revolutions. The light-emitting diodes remain turned on for periods which are the longer, the more gentle the operation of the internal combustion engine, in accordance with the mode of operation and the remaining conditions, based on the intervals of $4 \cdot 10^6$ revolutions and in proportion to an operating mode with extreme stress on the internal combustion engine.

The output 8 of the memory 2 is furthermore connected to a light-emitting diode 29 via an OR member 34; this diode has, for example, a yellow color. The light-emitting diode 29 is furthermore activated via a timing element 33 and the OR member 34; this timing element yields an output signal after an operating period of, for example, 11 months after conducting the last servicing. The light-emitting diode 29, which is permanently lit at $20 \cdot 10^6$ revolutions corresponding to five output pulses of the input attenuator $V_5$, is also turned on after the desired time period determined by the timing element 33 and also in this case draws attention to the fact that maintenance is required.

Additional, for example red light-emitting diodes 30 through 32 are directly connected to the inputs 10 to 12 of the memory 2 and reinforce the urgency of servicing to be performed.

Instead of merely digitally acting input attenuators $V_1$ to $V_4$, the load on the internal combustion engine can also be considered analog-wise. For this purpose, computing elements can be provided which multiply the arriving revolution pulses with a variable factor, changed in correspondence with the operating parameter considered, and/or which form the sum total of such variable factors in case of several operating parameters.

In order to avoid unnecessary inconveniencing of the driver by the signaling device, at least the light-emitting diodes 24 to 28 can be connected in series with an oil pressure switch 35 or the like. If the associated required distance routes have not as yet been traversed, the light-emitting diodes are lit up until the operating criterion of the internal combustion engine (here engine oil pressure) has been met.

By a corresponding expansion of the illustrated switching arrangement, the overdue intervals associated with the light-emitting diodes 30 to 32 can be halved with respect to the intervals for the light-emitting diodes 24 to 29. For this purpose, a factor of 2 input attenuator can be connected, for example, between the input attenuator $V_4$ and the input attenuator $V_5$, which first-mentioned attenuator remains activated until the output 8 of the memory 2 has been actuated. In order to turn off the light-emitting diodes 24 to 28 and to turn on the light-emitting diode 29 simultaneously with the turning off of the light-emitting diode 28, ten pulses are required in total, while merely three pulses from the input attenuator $V_5$ are necessary for activation of the light-emitting diodes 30 to 32.

Furthermore, by corresponding circuitry, it is possible to associate a time interval also with light-emitting diodes 24 to 28 and 30 to 32, besides the light-emitting diode 29. In such a case, a memory must be added corresponding to the memory 2, instead of the timing element 33, this memory having the same number of outputs and being timed by a timing pulse generator. Each output of this memory is connected, just as the outputs of memory 2, and by way of OR members to be additionally provided, in correspondence with the OR member 34, to the light-emitting diodes 24 through 32. By means of an analog input attenuator circuit, the objective can also be attained in this case again that the overdue time intervals in this case associated with the light-emitting diodes 30 to 32 are halved as compared with the desired time intervals for the light-emitting diodes 24 to 28 (or 29).

In dependence on the desired utilization, it is also possible to consider a load on a prime mover which manifests itself by a reduction in the number of revolutions and/or by a relative relief, recognizable by a rise in the number of revolutions. This case applies, for example, in a prime mover for a compressor. The input attenuators $V_3$ and $V_4$ can also provided for this purpose. As contrasted with the aforedescribed case of using the internal combustion engine, for example, for an automotive vehicle, the input attenuators $V_3$ and $V_4$ are disconnected at a relatively low speed (high load). With average numbers of revolutions (normal load), only one of the two input attenuators is then operatively connected. At higher numbers of revolutions (low load), both input attenuators $V_3$ and $V_4$ are effective. In this way the objective is attained that the evaluated number of revolutions is in an inverse ratio to the actual number of revolutions.

For reasons of clarity, expansions of the circuit arrangement have not been illustrated wherein two types of servicing can be differentiated. Such a circuit arrangement, illustrated in Patent Application No. 31 04 197.3, contains another memory which, after performance of a first service, is connected to the light-emitting diodes 24 to 32 instead of memory 2. The memory is timed by identical differential intervals at spacings, these intervals having been formed by subdividing the difference of the number of revolutions prevailing in case of the first service and a maximum revolution value twice as large as the limit value. In conjunction with such expansion, different luminous writings can also be provided which point, when the limit value for the number of revolutions has been reached, to the first service and, when the maximum number of revolution value has been attained and/or when the desired time period has elapsed, to the second service.

We claim:

1. A service interval indicating device for engines wherein a service interval is divided into plural serial equal increments, the engine having an output shaft for driving apparatus, comprising
    a signal generator means responsive to a plurality of threshold values of different characteristic operating parameters for generating a first signal,
    means responsive to the output shaft for actuating the signal generator means in accordance with the total number of revolutions of the output shaft,
    a plurality of control lights each assigned to a single increment of the service interval,
    means for controlling extinction of each of said control lights as the corresponding increment of the service interval is completed.

2. A service interval indicating device in accordance with claim 1, further comprising
    means generating a second signal in response to the engine load for modifying the output of the signal generator.

3. A service interval indicating device in accordance with claim 2, further comprising
    means applying a multiplying factor to modify the value of the number of revolutions of the output shaft used to generate the second signal.

4. A service interval indicating device in accordance with claim 3, further comprising
    means for activating the means applying the multiplying factor only at an extreme value of an operating parameter.

5. A service interval indicating device according to claim 4, wherein the multiplying factor is applied only when the operating parameter is one of above or below a predetermined value.

6. A service interval indicating device according to claim 5, wherein the multiplying factor is a constant.

7. A service interval indicating device according to claim 5, further comprising
    means for varying the multiplying factor in response to variation in the operating parameter.

8. A service interval indicating device according to claim 5, wherein at least one of said control lights differ in color from the remainder of said control lights as a warning.

9. A service interval indicating device according to claim 8, wherein service interval-increments occurring after a first service interval are designated as overdue increments and further comprising
    additional warning control lights, and
    means for activating a single one of said additional warning control lights after occurrence of each of a plurality of overdue increments.

10. A service interval indicating device according to claim 9, wherein each of said overdue increments is half as long as the increments of the service interval.

11. A service interval indicating device according to claim 9, wherein
    each overdue time increment is associated with a corresponding overdue increment of the service interval,
    the overdue time increments each being established as substantially half as long as a time increment so that each warning control light is actuated if the corresponding overdue time increment elapses before elapse of the corresponding overdue increment of the service interval.

12. A service interval indicating device according to claim 3, wherein the multiplying factor comprises a plurality of parts, each part being responsive to the magnitude of one of the different operating parameters.

13. A service interval indicating device according to claim 2, wherein the load is measured by the number of revolutions of the output shaft per predetermined period of time.

14. A service interval indicating device according to claim 2, further comprising
    means responsive to the temperature of an operating fluid as a function of engine load for actuating the signal generator means.

15. A service interval indicating device according to claim 14, wherein the operating fluid is cooling water.

16. A service interval indicating device according to claim 14, wherein the operating fluid is engine oil.

17. A service interval indicating device according to claim 2, wherein the means generating a second signal comprises
    means responsive to the fuel consumption rate to serve as a criterion of the load.

18. A service interval indicating device according to claim 1, further comprising
    means for extinguishing the control lamps in response to starting the engine.

19. A service interval indicating device according to claim 1, wherein
    a set value of time is associated with the service interval,
    the set value being subdivided into a number of time increments equal to the number of increments of the service interval, and that
    the switching condition of at least one of the control lamps is also changed if the respective time increment has elapsed before the corresponding service interval.

* * * * *